United States Patent [19]
Anderson et al.

[11] Patent Number: 5,659,480
[45] Date of Patent: Aug. 19, 1997

[54] METHOD FOR COORDINATING MOTION CONTROL OF A MULTIPLE AXIS MACHINE

[75] Inventors: Robb Gary Anderson, Wausau; Robert D. Lorenz, Madison; Andrew Joseph Meyer, Schofield, all of Wis.

[73] Assignee: Industrial Service And Machine, Incorporated, Schofield, Wis.

[21] Appl. No.: 495,284

[22] Filed: Jun. 27, 1995

[51] Int. Cl.$^6$ .............. G06F 19/00; G06F 15/00; G05B 19/10; B23D 7/00

[52] U.S. Cl. ............ 364/474.28; 364/512; 364/578; 364/474.3; 364/474.11; 364/474.01; 364/474.22; 364/167.01; 364/424.088; 318/567; 318/568.2; 409/235

[58] Field of Search .............. 364/474.28, 474.11, 364/474.01, 474.03, 474.22, 512, 578; 318/567, 568.2

[56] References Cited

U.S. PATENT DOCUMENTS

| | | | |
|---|---|---|---|
| 3,576,979 | 5/1971 | McCall | 235/151.11 |
| 4,135,239 | 1/1979 | Hamill, III et al. | 364/474.22 |
| 4,684,862 | 8/1987 | Röhrle | 318/568.2 |
| 4,751,442 | 6/1988 | Kurakake | 318/567 |
| 4,777,603 | 10/1988 | Wiidman et al. | 364/474.01 |
| 4,799,158 | 1/1989 | Patil | 364/424.088 |
| 4,947,336 | 8/1990 | Froyd | 364/474.3 |
| 4,999,784 | 3/1991 | Kawamura et al. | 364/474.01 |
| 5,025,385 | 6/1991 | Froyd | 364/474.11 |
| 5,187,656 | 2/1993 | Kurakake | 364/167.01 |
| 5,253,189 | 10/1993 | Kramer | 364/578 |
| 5,297,057 | 3/1994 | Kramer et al. | 364/512 |
| 5,368,425 | 11/1994 | Mills et al. | 409/235 |

OTHER PUBLICATIONS

Lorenz, R.D., & Schmidt, P.B., "Synchronized Motion Control for Process Automation, *Proceedings of the IEEE—IAS 1989 Annual Meeting*," pp. 1693–1699.

Dubowsky S; Papadopoulos E, The Kinematics, Dynamics, And Control of Free–Flying And Free–Floating Space Robotic System, Journal: IEEE Transactions on Robotics and Automation, V9, N5 (Oct), pp. 531–543 1993.

*Primary Examiner*—Reba I. Elmore
*Assistant Examiner*—McDieunel Marc
*Attorney, Agent, or Firm*—Quarles & Brady

[57] ABSTRACT

A multiple axis machine includes a plurality of servo-motors that produce movement of a member in at least two axes. The servo-motors are controlled by a computer which runs a simulation of a line shaft power train for producing movement of the member. Specifically, characteristics of a line shaft for powering the machine are defined along with characteristics of a pair of mechanical linkages with dynamically variable kinematics that are driven by the line shaft to produce movement along the two axes. The computer simulates a virtual line shaft using the line shaft characteristics and produces an angular acceleration, an angular velocity and an angular position of the virtual line shaft. The computer also simulates a pair of virtual mechanical linkages with dynamically variable kinematics based upon the linkage characteristics, and based on the angular acceleration, angular velocity and angular position of the virtual line shaft. The simulations produce control signals that operate actuators for each axis of the machine, and produce dynamically variable kinematic feedback force signals which are applied to the simulation of the virtual line shaft to simulate dynamically variable kinematic forces exerted by the mechanical linkages on the virtual line shaft.

23 Claims, 4 Drawing Sheets

METHOD FOR COORDINATING MOTION CONTROL OF A MULTIPLE AXIS MACHINE

BACKGROUND OF THE INVENTION

The present invention relates to controlling machines having members that move along or rotate about a plurality of axes, and more particularly to controllers that coordinate simultaneous movement of those members.

Machine tools commonly move a tool bit or other component in two or three axes to produce workpieces having two or three dimensional contours. Traditionally, such multiple axis machines were powered by a single motor which drove a common shaft. This power source often was referred to as a line shaft. Power was transferred from that line shaft to the different axes via mechanisms such as gears, cams and lead-screws. These mechanical linkages served two major purposes: the transfer of power and the coordination of relative motion among the axes. Inherent to the line shaft machine was inter-axis state feedback, or "stiffness," provided via the common power shaft. This inter-axis stiffness was the driving force for the coordination of the multiple axes and was bounded by the physical mechanics of the machines. In other words, resistance to movement along one axis was transferred back to the common line shaft and correspondingly affected the driving of mechanisms for the other axes. One example of this type of machine, which is still in frequent use today, is the engine lathe. Coordinated motion is accomplished with stiff, precision gear trains with user selectable ratios to fit individual machining applications. The degree to which the performance requirements are met is a function of the mechanical properties of the mechanisms and the ability to match a fixed number of gear ratios to the application. Precise matching of the requirements often could not be achieved by these machines.

As advances in computer control, power electronics and high performance servo-drives became available, programmable replacements for the hard-shafted machines began to evolve. The programmability allowed commands for multiple axes of motion to be coordinated together along with complex motion trajectories. One example of a machine using this control is a vertical CNC mill. The trajectory is computed off-line and the axes are controlled by computer controlled servo-motors. Although this power and flexibility provided enormous strides in manufacturing automation and precision, it lost some favorable attributes of the line-shaft predecessors. The mechanical inter-axis stiffness was not achieved by previous topologies for coordinating multiple axis motion with dynamically variable kinematics in programmable computer controlled machines.

Conventional methods for coordinating multiple degree-of-freedom machines were realized in programmable machines with a master command generator. The master command generator produced the required number of independent command references for the machine and synchronously sent these commands to each independent axis controller. This command reference could be precalculated and stored for later retrieval or computed in real-time. Numerous motion interpolation techniques can be utilized to facilitate a synchronous command generation technique. The independent time variable was discretized by the computer controller and was available to all of the required interpolating functions. Since all the functions received the same time reference, the functions produced the correct time synchronized commands.

However, these command generation topologies do not contain a mechanism which ensures that the machine synchronously tracks the command reference. This condition permits one axis to lag another in the presence of disturbances or drive saturation. For coordination to be maintained, the machine is required to produce stiff motion not only relative to the command reference, but most importantly, with respect to the other axes.

Another control mechanism is the slaving of one axis to another. The master-slave topology for command generation consists of a slower-responding axis serving as the master command generator and one or more other high performance slave axes servoing off the master's response. This topology is widely used in some sectors of the machine tool industry and represents a much closer analogy to the once standard line shaft machines than does the synchronized command topology.

If the slave controllers are modeled properly and tuned for similar closed-loop Eigenvalues, then synchronization will occur. However, if there are errors in the feedforward estimates or disturbances acting on one or more slave axes, the coordination of the machine suffers. Furthermore,.if a prescribed trajectory is infeasible, the system may enter the highly non-linear realm of saturation. These situations have many undesirable properties. Thus, present control topologies for computer controlled, servo-driven multiple axis machines emulating dynamically variable kinematics have not been able to replicate the beneficial inter-axis stiffness provided by line shaft machines.

SUMMARY OF THE INVENTION

A general object of the present invention is to provide a virtual common shaft control system for operating a multiple axis machine with dynamically variable kinematics.

Another object is to provide relative stiffness among independent axes which are connected via dynamically variable kinematic relationships and act collectively as a one input command-driven coordinated motion control system.

These objects are achieved by a method for controlling a machine which simulates a line shaft power train for driving each axis of the machine. The method involves simulating (on a computer) a "virtual" line shaft which has variable states of shaft acceleration, velocity and position. The computer also simulates a separate "virtual" mechanical linkage with dynamically variable kinematics for each independent axis of movement. The simulation of each virtual mechanical linkage uses the shaft states of acceleration, velocity and position to produce a virtual reference command vector for controlling the individual axis actuators. Furthermore, each axis produces a dynamically variable kinematic torque (force) state feedback signal representing an equivalent force which the virtual mechanical linkage exerts back on the virtual line shaft. The simulation of the virtual line shaft incorporates these state feedback force signals in its response for each axis of movement.

Although the machine actually has separately powered actuators, such as servo-motors that drive each axis, the machine operates as though the axes are driven from a common line shaft. By controlling the actuators with signals derived from the simulation of the virtual line shaft and virtual dynamically variable kinematic mechanical linkages, movement along or about a given axis is dependent upon the operation of the entire machine. Thus the present electronic control system provides the dynamically variable mechanical cross coupling of the axes found in mechanical cam driven, interconnected axes machines. As a consequence, if any combination of axes encounters either load resistance or is driven by the load, movement along or about the other axes are affected by that resistance such that synchronization of all axes is maintained.

DETAILED DESCRIPTION OF THE INVENTION

Figure 1:
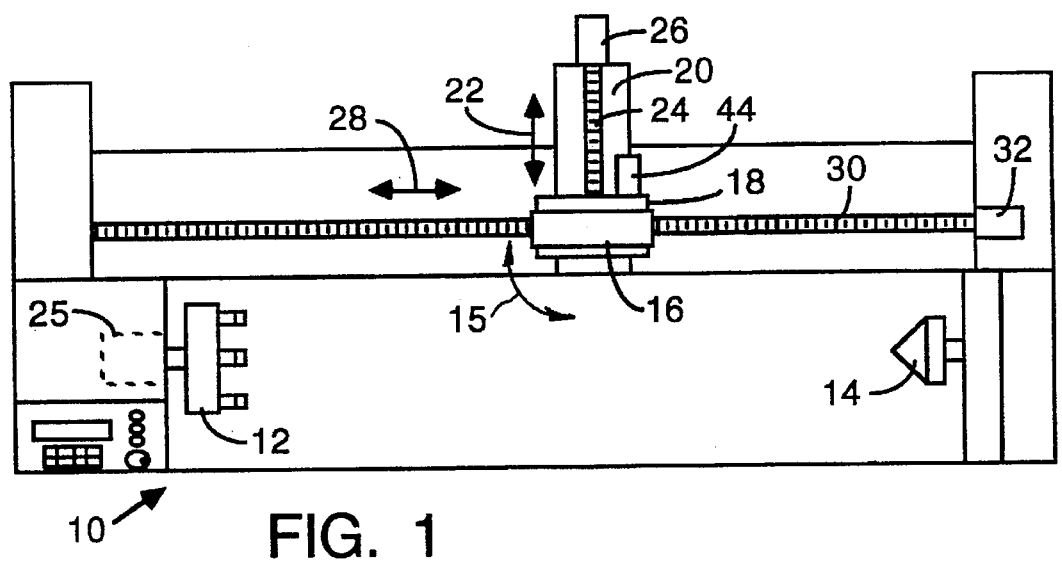
FIG. 1 is a top view of a multiple axis machine.
Figure 2:
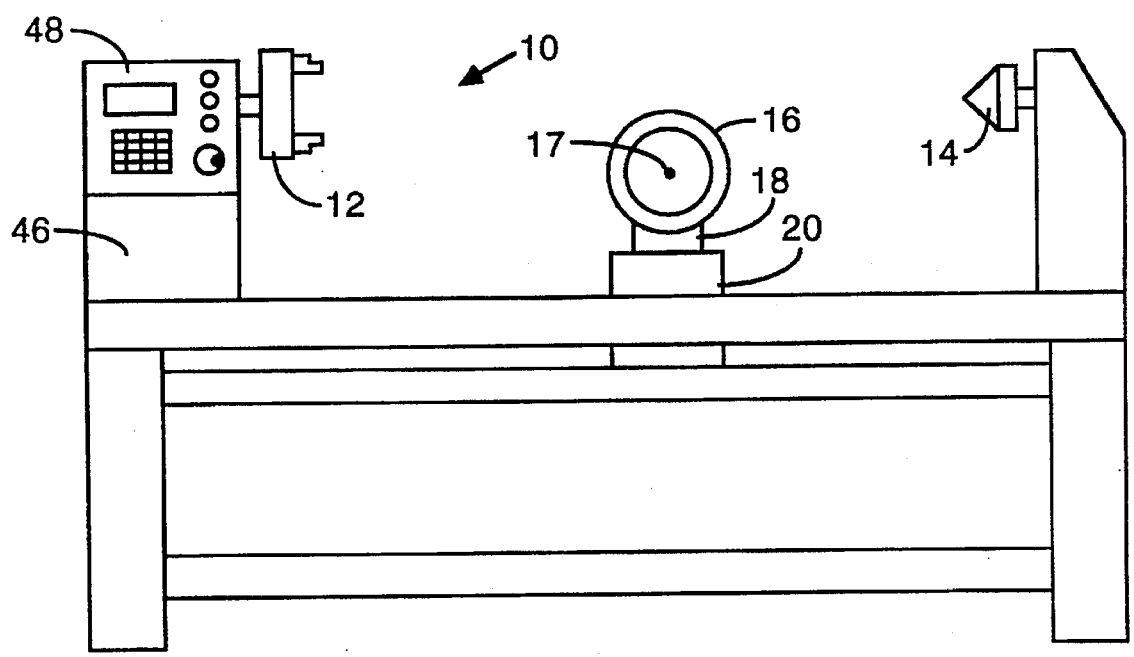
FIG. 2 is a side view of the multiple axis machine.

With initial reference to FIGS. 1 and 2, a filament winding machine 10 can be used to apply a matrix of fiber and resin, under controlled tensions, to a mandrel in a predetermined geometrical pattern. For example, a tank can be fabricated over a thin metal form by applying repeated layers of a resin coated fiber to the outside of the metal form. When the resin cures, a solid outer casing having significant strength has been formed. In such an application, the metal form mandrel (not shown) is placed between chuck 12 and spindle 14. The chuck 12 is driven by a servo-motor 25 to rotate the mandrel. As the mandrel rotates, one or more resin-coated fibers is fed through a reciprocating payout eye 16 and wrapped around the mandrel.

The pay-out eye 16 is mounted on a base 18 that rides on a carriage 20. The base 18 moves along a crossfeed axis in reciprocal directions, indicated by arrows 22, perpendicular to the axis of mandrel rotation in the horizontal plane. Specifically, the base 18 is connected to a crossfeed lead screw 24 that is driven by a crossfeed servo-motor 26 to produce translational movement perpendicular to carriage 20. Similarly, the carriage moves in reciprocal directions, indicated by arrows 28, along a translational axis that is parallel to the axis of mandrel rotation. For this movement, the carriage 20 is connected to another lead screw 30 that is driven by a carriage servo-motor 32 and mounted to the frame of the filament winding machine 10. Furthermore, the payout eye 16 can pivot with respect to base 18, as indicated by arrows 15, when driven by a pivot servo-motor 44. Another servo-drive can be provided to rotate the payout eye 16 about center point 17, if desired.

In order to properly wind the filament in a pattern that precisely covers the mandrel with a strong outer layer, the movement along the axes denoted by arrows 22 and 28 as well as the pivoting of the payout eye 16 indicated by arrows 15 must all be coordinated with respect to one another and with the mandrel rotation. That coordination is provided by an electronic control circuit which operates the servo-motors 26, 32 and 44 as well as the motor 25 for chuck 12. The control circuit is located within a housing 46 which includes a control panel 48 that provides a keyboard and joy stick for the operator to use in sending commands to the machine. The operator control panel 48 also includes an alphanumeric display and indicator lights that provide status information about the machine operation to the operator.

Figure 3:
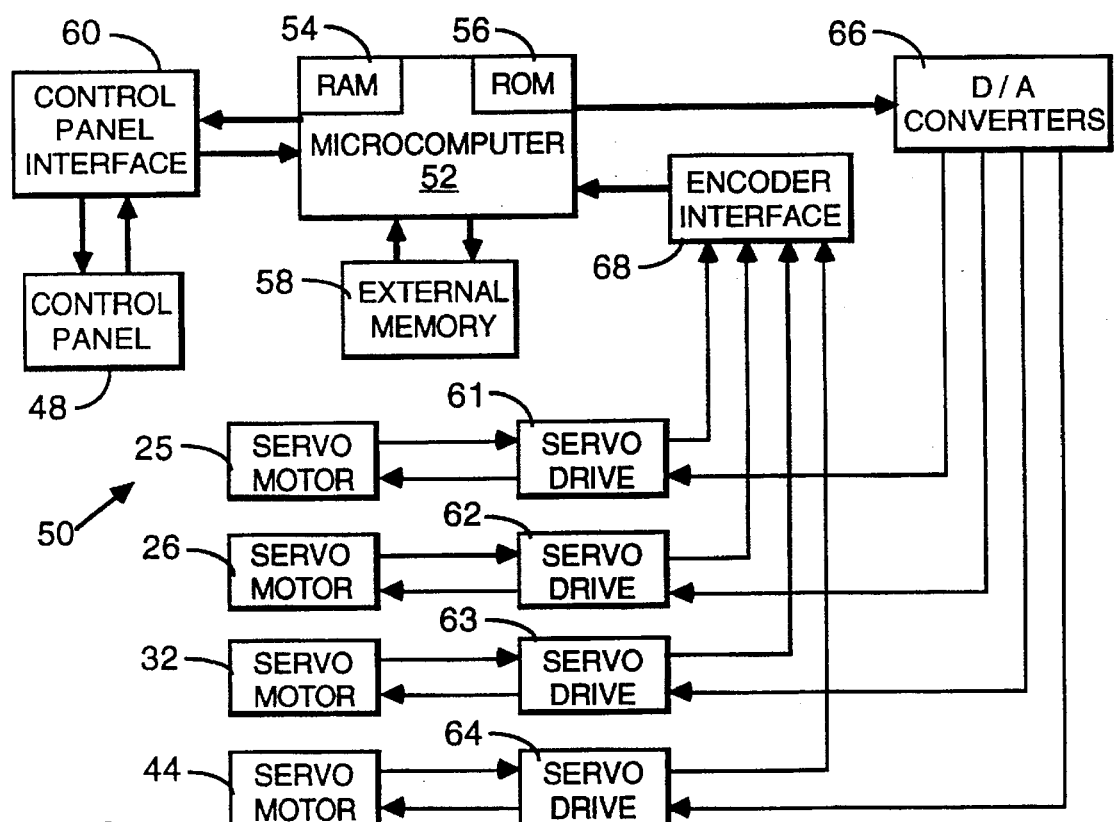
FIG. 3 is a schematic block diagram of the electronic control system for the multiple axis machine.

The electronic control system 50 for operating the filament winding machine 10 is shown in FIG. 3. The control system 50 is built around a microcomputer 52 which includes input/output circuits, one or more central processing units, a random access memory 54 and a read only memory 56. The microcomputer 52 is also connected to an external memory 58 that provides additional storage for the control program of the filament winding machine. The control panel 48 is connected to the microcomputer by a control panel interface circuit 60.

The microcomputer 52 also is interfaced to the four servo-motors 25, 26, 32 and 44, and to additional servo-motors for any other axes of movement provided by the machine. Specifically, each servo-motor comprises a motor that is connected to a position sensor, such as an optical encoder, which provides an indication of the position of the component driven by the lead screw or rotary member attached to the motor. The motor and the position sensor within each servo-motor 25, 26, 32 and 44 is connected to a separate servo-drive 61–64. Electricity for operating the motors is controlled by the associated servo-drive 61–64 in response to an analog voltage level received from a set of digital to analog (D/A) converters 66. In order to operate a particular servo-motor, the microcomputer 52 sends the appropriate D/A converter 66 a digital command which defines the level of torque to be generated by the motor. The D/A converter 66 produces an analog signal having a voltage level that corresponds to the digital torque level and applies that analog signal to the servo-drive 61–64 associated with the motor. The conventional servo-drive controls the application of electricity to the servo-motor in order to produce the commanded torque level. Alternatively, the D/A converters 66 could be eliminated if the servo drives 61–64 could receive digital commands directly from the microcomputer 52.

As the servo-motor 25, 26, 32 or 44 moves, the signal from its associated position sensor is fed through the corresponding servo-drive 61–64 to a sensor interface 68. The sensor interface 68 converts the signals from the position sensor into a digital representation of the position $\theta_n$ of the axis that is driven by the corresponding motor, where n is a numerical designation of the particular one of the four axes. This digital position value is applied to an input of microcomputer 52 which uses the value to determine the velocity $\omega_n$ of the lead screw or rotary member that is driven by the motor.

According to the present invention, the control circuit 50 executes a software program for the filament winding machine 10 which simulates a virtual line shaft driven machine. An actual line shaft has a number of cams located along its length which transfer power to followers which ride on the cams. A cam is a mechanical linkage that produces a dynamically variable kinematic relationship between input and output motion and forces. Cams produce position, velocity, acceleration and torque (force) relationships which are a function of their surface profile and are mechanically very stiff so as to provide the potential for high accuracy tracking of the desired profile. Thus, given complex shapes, cams can generate sophisticated motion and torque (force) profiles. Cams can be considered as devices which produce a spatial follower output which is either linear or non-linear with respect to the independent input variable(s).

The kinematic motion relationships of position, velocity, acceleration and torque for a cam and follower pair are given by the following four equations:

$$\theta^*(\theta_v) = f(\theta_v) \qquad (1)$$

-continued $$\omega^*(\theta_v, \omega_v) = \frac{\partial \theta^*}{\partial \theta_v} \cdot \omega_v \quad (2)$$

$$= \text{Cam Gain}(\theta_v) \cdot \omega_v$$

$$\dot{\omega}^*(\theta_v, \omega_v, \dot{\omega}_v) = \frac{\partial^2 \theta^*}{\partial \theta_v^2} \cdot \omega_v^2 + \frac{\partial \theta^*}{\partial \theta_v} \cdot \dot{\omega}_v \quad (3)$$

$$T^* \cdot \text{Cam Gain}(\theta_v) = T_v \quad (4)$$

where $\theta_v$, $\omega_v$, $\dot{\omega}_v$ and $T_v$ refer to position, velocity, acceleration and torque of the line shaft to which the cam is attached, and $\theta^*$, $\omega^*$, $\dot{\omega}^*$ $T^*$ refer to the position, velocity, acceleration and torque of the follower output. The relationship between the input and output positions of the cam and follower pair as expressed by Equation (1) is defined by the physical contour of the cam surface and the follower mechanism and is specified by coupling characteristics of the cam and follower. The most useful relationship for cam and follower motion kinematic modelling are given by Equations (2) and (4) which can be thought of as an operating point "Cam Gain", or generically as a gain factor, that is a function of the present input position.

The design of cam and follower pairs is well-understood by engineers and can be expressed in numerical terms as a set of cam positions and desired follower positions which the cam and follower pair is to follow. From that specification a mathematical function can be smoothly fit to this data using various interpolating functions.

Although the present invention is being described in terms of a line shaft with cams to transfer power to each axis, the inventive concept can be applied by those skilled in the art to other mechanical systems. Other types of common power mechanical sources can be utilized in place of a conventional line shaft and thus the term line shaft as used herein includes such analogous power sources. Furthermore, other mechanical linkages with dynamically variable kinematics can be substituted for a cam-follower mechanism to transfer power from the line shaft to mechanical components for a given axis. Such mechanical linkages can be simulated in the same manner as the cam-follower being described in detail.

Figure 4:
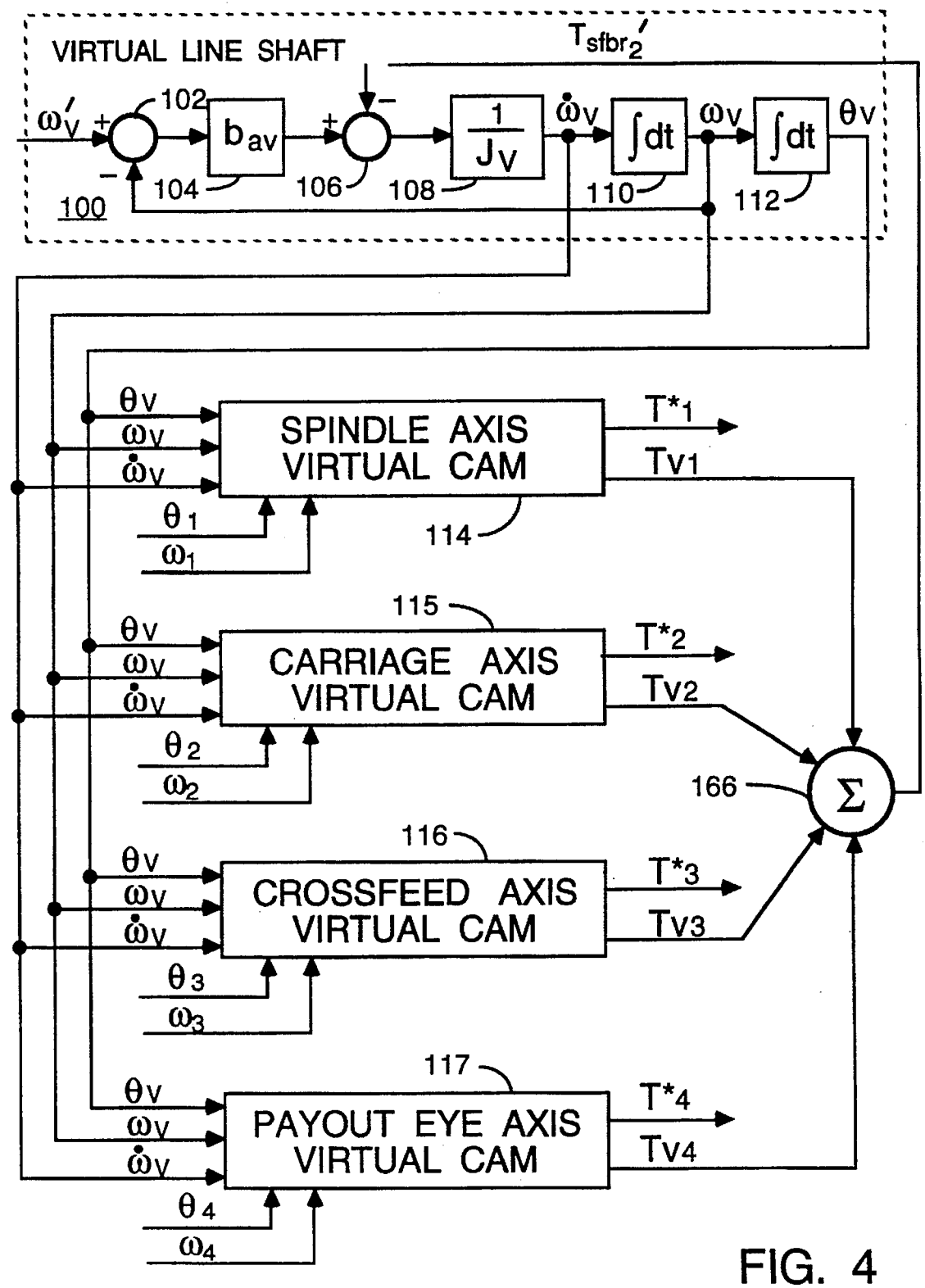
FIG. 4 is a block diagram of a four-axis virtual line shaft control system which is implemented by software in the computer of the machine.

FIG. 4 is a functional block diagram of the virtual line shaft control system which is simulated by the microcomputer 52 to produce torque command signals for the servo-motors 25, 26, 32 and 44. Block 100 represents the functional equivalent of a line shaft which is used to simulate a virtual line shaft in the control system 50. Specifically, the input angular velocity $\omega_v$, emulates the no-load line shaft speed. This angular velocity is summed with a feedback signal in summer 102 with the result being applied to function block 104 where the resultant value is multiplied by a variable $b_{av}$, corresponding to the viscous friction or viscous damping gain of the line shaft. The product from function block 104 is applied to a second summer 106 where a feedback torque value designated $T_{sfbr2}$, is subtracted from the product. The resultant value is applied to function block 108 where the input is divided by quantity $J_v$ which represents the inertia of the virtual line shaft. The output of function block 108 is a numerical value corresponding to the angular acceleration $\dot{\omega}_v$ of the virtual line shaft 100. The angular acceleration is integrated at step 110 to produce the angular velocity $\omega_v$ which is fed back as the negative input of the first summer 102. The value corresponding to the angular velocity $\omega_v$ is applied to a second integrator 112 to produce a value of the angular position $\theta_v$ of the virtual line shaft 100. The viscous friction or viscous damping gain $b_{av}$, and inertia $J_v$ are characteristics of the virtual line shaft that are analogous to the physical mechanical line shaft characteristics when driven by conventional prime movers. The angular acceleration, velocity and position of the line shaft, along with the command vector variables of position $\theta_n$, velocity $\omega_n$ and acceleration $\dot{\omega}_n$ for each axis n, are collectively referred to as the "command vector variable states."

The virtual line shaft 100 is functionally coupled to four or more virtual cams 114–117 which are simulated by microcomputer 52 also. Specifically, virtual cam 114 represents the mechanical linkage between the virtual line shaft and the spindle axis, that drives chuck 12. Virtual cam 115 corresponds to the movement of the carriage axis operated by the carriage servo-motor 32 and virtual cam 116 corresponds to the crossfeed axis which is operated by crossfeed servo-motor 26. Finally, virtual cam 117 corresponds to the payout eye axis driven by the payout eye servo-motor 44.

The real-time simulation of each virtual cam 114–118 produces an output signal $T_n^*$ which is the torque command that is sent to the servo-drive 61–64 for the axis designated by the number n. Also produced by the real-time virtual cam simulation is a torque feedback signal $T_{v_n}$ which represents the force applied by the follower for axis n to the corresponding cam attached to the virtual line shaft 100. By implementing the functional diagram shown in FIG. 4 in the software of the filament winding machine's computer control circuit 50 and using the results of that simulation to control each of the servo-motors 25, 26, 32 and 44, the machine 10 has the response of a conventional line shaft driven machine. In other words, by simulating the line shaft and the mechanical linkage that transfers force between the line shaft and the mechanisms for each axis of the filament winding machine, the axes take on the characteristics, such as relative stiffness, of a mechanically cross coupled machine with dynamically variable kinematics. This is in contrast to conventional computer-operated machines which used other techniques for operating each of the multiple axes as described previously.

Figure 5:
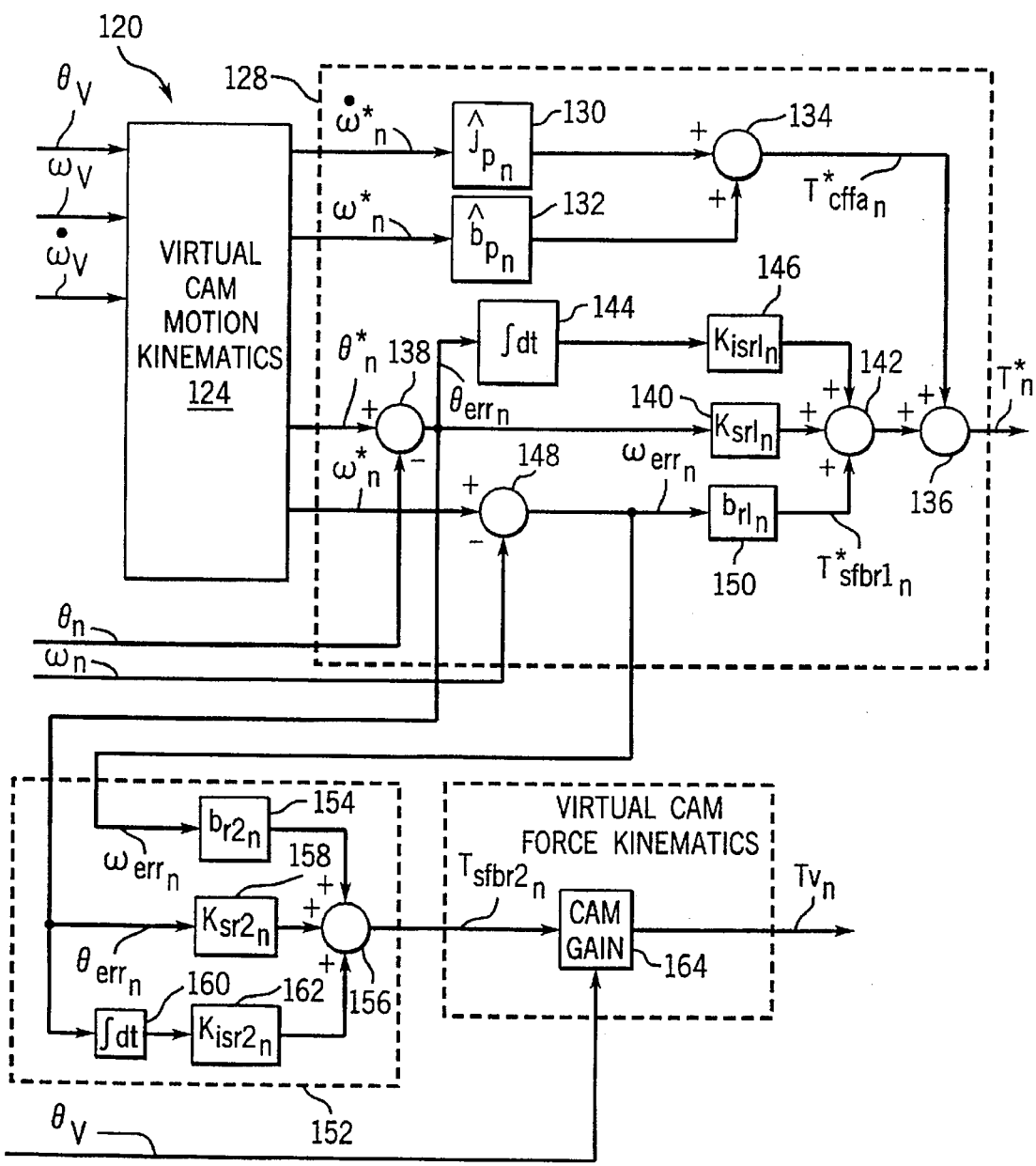
FIG. 5 is a functional block diagram of the control technique for each axis of the control system shown in FIG. 4.

With reference to FIG. 5, each of the virtual cams 114–117 provides a functional simulation of the mechanical linkage between the virtual line shaft 100 and machine components that move along or about each of the four axes. The functional diagram is shown in terms of a cam and follower pair that converts rotational movement and torque, and thus has a desired angular acceleration $\dot{\omega}^*_n$, angular velocity $\omega^*_n$, angular position $\theta^*_n$ and torque $T^*_n$, as well as position $\theta_n$, velocity $\omega_n$ and acceleration $\dot{\omega}_n$ values for each axis n. For axes that provide translational movement and thus have another type of mechanical linkage, the notation can be changed to linear acceleration, linear velocity, linear position and force as will be apparent to one skilled in the art. The functional simulation utilizes characteristics of line shaft mechanical linkage characteristics that are familiar to designers of physical line shaft mechanical systems. These characteristics include the physical load inertia $J_p$, physical damping $b_p$, active relative stiffness gains of damping $b_{r1}$, stiffness $K_{sr1}$ and integrated stiffness $K_{isr1}$ of the line shaft and cam follower axis mechanism. The integrated stiffness control state is a fictitious state that does not exist in the real world, but that very beneficial state is familiar to state based motion control designers.

The virtual cam mechanism 120 receives as inputs the "command vector variable states" of angular acceleration $\dot{\omega}_v$, angular velocity $\omega_v$ and angular position $\theta_v$ from the virtual line shaft 100. These inputs are fed to a Virtual Cam Motion Kinematics function block 124 which applies Equations (1), (2) and (3) above to that input data to produce a "virtual reference command vector" comprising desired angular position $\theta^*$, angular velocity $\omega^*$ and angular acceleration ω* of the shaft coupled to the virtual cam follower. This function block maps the movement of the virtual line shaft to dynamically variable kinematic movement of a mechanism that drives one particular axis of the machine 10.

The three parameters of the virtual reference command vector from virtual cam motion kinematics function block 124 are applied as inputs to a closed loop axis motion control section 128 which also receives the actual position $\theta_n$ and angular velocity $\omega_n$ of the corresponding axis mechanism n derived from the position sensor signals. Section 128 provides a feedforward control path for the axis physical inertia and damping parameters, as well as providing a feedback control to account for errors due to disturbances of the axis mechanism.

The feedforward control features are provided at function block 130 where the acceleration $\omega^*_n$ is multiplied by an estimate of the output system's physical inertia $\hat{J}_{Pn}$. Similarly, the cam output velocity $\omega^*_n$ is multiplied by function $\hat{b}_{Pn}$ which is an estimate of the physical damping (drag) of the axis mechanism, at block 132. The results of the operation performed at blocks 130 and 132 are summed at point 134 to produce a value designated $T^*_{cffa_n}$ which represents the estimated torque that the servo motor must generate in order to compensate for the inertia and drag of the axis mechanism. This torque value is applied to a summing point 136.

The closed loop axis motion control block 128 also provides a torque value designated $T^*_{sfbr1_n}$ which represents the torque required to be applied to the mechanical axis in order to compensate for disturbances. This torque value contains a virtual connecting shaft component derived by subtracting the actual axis position $\theta_n$ from the desired position $\theta^*_n$ at point 138 to determine the difference $\theta_{err_n}$ between the desired and the actual axis position. The numerical value of the error $\theta_{err_n}$ is fed to function block 140 which applies the active relative stiffness gain $K_{sr1_n}$ of the mechanical axis to the error signal and sends the result to a summation node 142. The axis position error $\theta_{err_n}$ also is integrated at block 144 to produce a result that is then acted upon by the integrated stiffness gain $K_{isr1_n}$. The result of the functions performed by blocks 144 and 146 are applied to another input of summing node 142.

The closed loop motion control section 128 also derives the velocity error $\omega_{err_n}$ for the mechanical axis. To do so, the desired axis velocity $\omega^*$ is applied from the virtual cam motion kinematics function block 124 to summing node 148. From the desired axis velocity, the summing node 148 subtracts the actual axis velocity $\omega_n$ produced by microcomputer 52 in response to the signals from the position sensor for that axis. The output of the summing node 148 is the velocity error value $\omega_{err}$ which is sent to function block 150 and operated upon by the active damping gain $b_{r1_n}$ of the mechanical axis. The output of function block 150 represents the torque level associated with the relative velocity difference and the active damping gain, and that torque level is applied as another input to summing node 142. The result of the summation which occurs at node 142 is the desired torque that is required to overcome system disturbances for this particular axis. The blocks 140, 146 and 150 define the relative stiffness of the virtual connecting shaft and produce a torque value $T^*_{sfbr1_n}$ associated with these gains. The torque value produced from node 142 is summed at node 136 with the feedforward torque value from node 134 to produce the torque output command $T_n^*$ that is required for the axis at this point in time. Torque output command $T_n^*$ is sent from the microcomputer 52 to the D/A converter 66 for this axis and thereby produces the torque command for the servo-drive 61–64 for this axis so that the associated servomotor is operated to produce required the torque levels.

Relative stiffness also is utilized in functional section 152 as part of a feedback loop that affects the operation of the virtual line shaft 100. In other words, the relative stiffness of each mechanical axis is reflected back to the operation of the virtual line shaft 100. Thus, just as in the mechanical analogue, the stiffness of the electronically controlled axis affects the operation of the virtual line shaft and in turn the other axes which are driven by the virtual line shaft. Specifically, the relative stiffness feedback section 152 receives the axis position error $\theta_{err_n}$ and angular velocity error $\omega_{err_n}$ from section 128. The relative damping $b_{r2_n}$ is applied at function block 154 to the axis velocity error $\omega_{err_n}$. This is the same type of operation performed at step 150 in the closed loop axis motion control and in a true mechanical system, both of these function blocks could use the same value for the shaft damping. However, as this is a simulation, different values can be utilized in each block if desired. The same is true for the operators $K_{sr2_n}$ and $K_{isr2_n}$ in blocks 158 and 162 and those of previously described blocks 140 and 146, respectively. The output of function block 154 is sent to a summing node 156. The position error $\theta_{err_n}$ is operated upon by the stiffness gain $K_{sr2_n}$ at block 158 and the result applied to summing node 156. Similarly, the position error is integrated at step 160 and the result operated upon by the integrated stiffness gain for this axis at block 162 with the final result being applied to summing node 156. The outputs from function 154, 158 and 162 are summed at node 156 to produce a torque value $T_{sfbr2_n}$ that represents the feedback torque from the mechanical axis.

At function block 164, the torque feedback value $T_{sfbr2_n}$ is multiplied by the dynamically variable kinematic cam gain as given by Equation (4) above. This operation produces a torque value $T_{vn}$ representing the torque (force) that the relative stiffness of the axis mechanism exerts on virtual line shaft 100.

Referring again to FIG. 4, each of the torque feedback outputs $T_{vn}$ from the four virtual cams 114–117 are summed at node 166 to produce a value $T_{sfbr2}'$ which represents the total torque (force) exerted by all of the axis mechanisms on the virtual line shaft. This total torque (force) value is applied to a subtracting input of the second summer 106 in the virtual line shaft 100. This coupling of the feedback torque to the virtual line shaft causes the operation of the virtual line shaft to take into account the backward torque (force) from all of the axes. In other words, the feedback torque $T_{sfbr2}'$ provides the mechanical cross coupling found in a true line shaft machine in the electronic control of the filament winding machine 10 where each axis is operated by a separately powered servo-motor.

As noted previously, the functional diagrams of FIGS. 4 and 5 are implemented by the control program that is executed by microcomputer 52 to simulate a line shaft controlled machine. Thus, in order to operate the filament winding machine 10, the user specifies the angular velocity $\omega_v'$ which defines the speed of the virtual line shaft. From this single input value, the microcomputer 52 derives the servo-drive torque commands $T_n^*$ for each of the four axes of movement for the machine. When one or more of the axes encounters a disturbance, for example drag on the carriage axis by the winding of the filament on the mandrel, the disturbance is reflected onto the movement of the other axes via the simulation of the virtual line shaft machine in the microcomputer. Specifically in this case, the position $X_2$ and velocity $V_2$ of the carriage axis sensed by the position sensor will be different from the desired values for those parameters as the result of the disturbance. The microcomputer 52 in simulating the carriage axis virtual cam 115 produces error values $V_{err}$ and $X_{err}$ representing the difference between the actual and desired values for these parameters. These error values as previously described with respect to FIG. 5 affect the torque feedback signal $T_{vn}$ which reflects the disturbance onto the virtual line shaft 100. The effect of the feedback torque on the virtual line shaft then is transferred to the operation of the other axes of the machine. In this manner, the simulation of the virtual line shaft and cam-follower mechanisms for each axis generates the torque control signals for the axis servo-motors and as a consequence of the use of the simulation to control the axes, the inter-axis coupling is affected.

The foregoing description was primarily directed to a preferred embodiment of the invention while some attention was given to various alternatives within the scope of the invention. It is anticipated that one skilled in the art will likely realize additional alternatives from the disclosure of embodiments of the invention. For example, although the present invention is being described in the context of a filament winding machine, the concepts can be applied to other multiple axis machines. Accordingly, the scope of the invention should be determined from the following claims and not limited by the above disclosure.

We claim:

1. A method for controlling a machine which has members that move with respect to first and second axes wherein movement with respect to each axis is produced by a separately powered actuator controlled by a computer and wherein movement along each axis is controlled in response to motion along another axis, said method comprising:

sensing a first position of machine movement with respect to the first axis;

determining a first velocity of machine movement with respect to the first axis;

sensing a second position of machine movement with respect to the second axis;

determining a second velocity of machine movement with respect to the second axis;

simulating on the computer a virtual line shaft which has variable states of shaft acceleration, shaft velocity and shaft position, wherein said simulating includes a virtual replication of relative stiffness of a mechanical line shaft;

simulating on the computer a virtual first mechanical linkage with dynamically variable kinematics which responds to the shaft acceleration, shaft velocity, shaft position, the first position and the first velocity, wherein simulating the virtual first mechanical linkage produces a first control signal for operating a first actuator of the machine and produces a first dynamically variable kinematic force feedback signal;

simulating on the computer a virtual second mechanical linkage with dynamically variable kinematics which responds to the shaft acceleration, shaft velocity and shaft position, the second position and the second velocity, wherein simulating the virtual second mechanical linkage produces a second control signal for operating a second actuator of the machine and produces a second dynamically variable kinematic force feedback signal;

operating the first actuator in response to the first control signal; and operating the second actuator in response to the second control signal;

wherein the step of simulating a virtual line shaft is responsive to the first and second dynamically variable kinematic force feedback signals.

2. A method for controlling a machine having members that move with respect to first and second axes wherein movement with respect to each axis is produced by a separately powered actuator controlled by a computer and wherein movement along each axis is controlled in response to motion along another axis, said method comprising steps of:

defining characteristics of a line shaft for powering the machine;

defining characteristics of a first mechanical linkage with dynamically variable kinematics that is driven by the line shaft to produce movement with respect to the first axis;

defining characteristics of a second mechanical linkage with dynamically variable kinematics that is driven by the line shaft to produce movement with respect to the second axis;

simulating a virtual line shaft on the computer using the characteristics of a mechanical line shaft including a virtual replication of relative stiffness, wherein the simulating produces an angular position value of the virtual line shaft, an angular velocity value of the virtual line shaft and an angular acceleration value of the virtual line shaft;

simulating a virtual first mechanical linkage on the computer using the characteristics of a first mechanical linkage, the angular velocity value of the virtual line shaft, the angular position value of the virtual line shaft, a first position $\theta_1$ of machine movement with respect to the first axis, a first velocity $\omega_1$ of machine movement with respect to the first axis, wherein simulating the virtual first mechanical linkage produces a first control signal for operating a first actuator of the machine and produces a first force feedback signal representing force applied by the virtual first mechanical linkage to the virtual line shaft;

operating the first actuator in response to the first control signal;

simulating a virtual second mechanical linkage on the computer using the characteristics of a second mechanical linkage, the angular velocity value of the virtual line shaft, the angular position value of the virtual line shaft, a second position $\theta_2$ of machine movement with respect to the second axis, a second velocity $\omega_2$ of machine movement with respect to the second axis, wherein simulating the virtual second mechanical linkage produces a second control signal for operating a second actuator of the machine and produces a second force feedback signal representing force applied by the virtual second mechanical linkage to the virtual line shaft; and operating the second first actuator in response to the second control signal;

wherein the step of simulating a virtual line shaft also is responsive to the first and second force feedback signals.

3. The method as recited in claim 2 wherein simulating the virtual first mechanical linkage with dynamically variable kinematics comprises producing a virtual reference command vector by:

deriving a linkage position value $\theta_1^*$ as a function of the angular position value of the virtual line shaft and the characteristics of the first mechanical linkage;

deriving a linkage velocity value $\omega_1^*$ as a function of the angular velocity value of the virtual line shaft, the angular position value of the virtual line shaft, and the characteristics of the first mechanical linkage; and deriving a linkage acceleration value $\dot{\omega}_1^*$ as a function of the angular acceleration value of the virtual line shaft, the angular position value of the virtual line shaft, the angular velocity value of the virtual line shaft, and the characteristics of the first mechanical linkage.

4. The method as recited in claim 3 wherein simulating the virtual first mechanical linkage further comprises:

deriving a first intermediate value as a function of the linkage velocity value $\omega_1^*$ and an estimate of physical damping gain $b_P$ for the first axis;

deriving a second intermediate value as a function of the linkage acceleration value $\dot{\omega}_1^*$ and an estimate of the physical inertia $J_{P1}$ for the first axis; and combining the first intermediate value and the second intermediate value to produce a first force value from which the first control signal is produced.

5. The method as recited in claim 2 further comprising:

sensing the first position $\theta_1$ of machine movement with respect to the first axis;

deriving from the first position $\theta_1$, the first velocity $\omega_1$ of machine movement with respect to the first axis.

6. The method as recited in claim 5 further comprising:

sensing the second position $\theta_2$ of machine movement with respect to the second axis; and deriving from the second position $\theta_2$, the second velocity $\omega_2$ of machine movement with respect to the second axis.

7. The method as recited in claim 2 wherein simulating the virtual first mechanical linkage further comprises:

deriving a linkage velocity value $\omega_1^*$ as a function of the angular position value and the angular velocity value of the virtual line shaft and the characteristics of the first mechanical linkage;

determining a velocity error value $\omega_{err_1}$ from a difference between linkage velocity value $\omega_1^*$ and the first velocity $\omega_1$; and producing the first control signal by applying a value corresponding to an active damping gain $b_{r1_1}$ of the first axis to the velocity error value $\omega_{err_1}$.

8. The method as recited in claim 2 wherein simulating the virtual first mechanical linkage further comprises:

deriving a linkage position value $\theta_1^*$ as a function of the angular position value of the virtual line shaft and the characteristics of the first mechanical linkage;

determining a position error value $\theta_{err_1}$ from a difference between the linkage position value $\theta_1^*$ and the first position $\theta_1$; and producing the first control signal by applying a value corresponding to an active stiffness gain $K_{sr1_1}$ of the first mechanical linkage to the position error value $\theta_{err_1}$.

9. The method as recited in claim 2 wherein simulating the virtual first mechanical linkage further comprises:

deriving a linkage velocity value $\omega_1^*$ as a function of the angular velocity value of the virtual line shaft, the angular position value of the virtual line shaft, and the characteristics of the first mechanical linkage; and determining a velocity error value $\omega_{err_1}$ from a difference between the linkage velocity value $\omega_1^*$ and the first velocity $\omega_1$;

deriving a first intermediate value by applying a value corresponding to an active damping gain $b_{r1_1}$ of the first axis to the velocity error value $\omega_{err_1}$;

deriving a linkage position value $\theta_1^*$ as a function of the angular position value, the angular position value of the virtual line shaft and the characteristics of the first mechanical linkage;

determining a position error value $\theta_{err_1}$ from a difference between the linkage position value $\theta_1^*$ and the first position $\theta_1$;

deriving a second intermediate value by applying a value corresponding to an active stiffness gain $K_{sr1_1}$ of the first mechanical linkage to the position error value $\theta_{err_1}$;

integrating the position error value $\theta_{err_1}$ to produce an integrated error value;

deriving a third intermediate value by applying a value corresponding to an integrated active stiffness gain $K_{isr1}$ of the first mechanical linkage to the integrated error value; and combining the first intermediate value, the second intermediate value and the third intermediate value to produce a first force value $T^*_{sfbr1_1}$ from which the first control signal is produced.

10. The method as recited in claim 9 wherein simulating the virtual first mechanical linkage further comprises:

deriving a fourth intermediate value as a function of the linkage velocity value $\omega_1^*$ and an estimate of physical damping gain $b_P$ for the first axis;

deriving a linkage acceleration value $\dot{\omega}_1^*$ as a function of the angular acceleration value of the virtual line shaft, the angular position value of the virtual line shaft, the angular velocity value of the Virtual line shaft, and the characteristics of the first mechanical linkage;

deriving a fifth intermediate value as a function of the linkage acceleration value $\dot{\omega}_1 I$ and an estimate of the physical inertia $J_{P1}$ for the first axis; and combining the fourth intermediate value and the fifth intermediate value to produce a second force value $T^*_{cffa_1}$; and producing the first control signal by combining the first force value $T_{sfbr1_1}$ and the second force value $T^*_{cffa1}$.

11. The method as recited in claim 2 wherein simulating the virtual first mechanical linkage further comprises:

deriving a linkage velocity value $\omega_1^*$ as a function of the angular position value and the angular velocity value of the virtual line shaft and the characteristics of the first mechanical linkage;

determining a velocity error value $\omega_{err_1}$ from a difference between linkage velocity value $\omega_1^*$ and the first velocity $\omega_1$; and deriving a first intermediate value by applying a value corresponding to an active damping gain $b_{r1_1}$ of the first axis to the velocity error value $\omega_{err_1}$;

deriving a linkage position value $\theta_1^*$ as a function of the angular position value of the virtual line shaft and the characteristics of the first mechanical linkage;

determining a position error value $\theta_{err_1}$ from a difference between the linkage position value $\theta_1^*$ and the first position $\theta_1$;

deriving a second intermediate value by applying a value corresponding to an active stiffness gain $K_{sr1_1}$ of the first mechanical linkage to the position error value $\theta_{err_1}$; and combining the first intermediate value and the second intermediate value to produce a force value $T^*_{sfbr1_1}$ from which the first control signal is produced.

12. The method as recited in claim 2 wherein simulating the virtual first mechanical linkage further comprises:

deriving a linkage position value $\theta_1^*$ as a function of the angular position value, the angular position value of the virtual line shaft and the characteristics of the first mechanical linkage;

determining a position error value $\theta_{err_1}$ from a difference between the linkage position value $\theta_1^*$ and the first position $\theta_1$;

integrating the position error value $\theta_{err_1}$ to produce an integrated error value;

producing the first control signal by applying a value corresponding to an integrated active stiffness gain $K_{isr1}$ of the first mechanical linkage to the integrated error value.

13. The method as recited in claim 2 wherein simulating the virtual first mechanical linkage further comprises:

deriving a linkage velocity value $\omega_1^*$ as a function of the angular velocity value of the virtual line shaft, the angular position value of the virtual line shaft, and the characteristics of the first mechanical linkage;

determining a velocity error value $\omega_{err_1}$ from a difference between the linkage velocity value $\omega_1^*$ and the first velocity $\omega_1$;

deriving a force feedback value by applying a value corresponding to an active damping gain $b_{r2_1}$ of the first axis to the velocity error value $\omega_{err_1}$; and producing the first force feedback signal from the force feedback value.

14. The method as recited in claim 2 wherein simulating the virtual first mechanical linkage further comprises:

deriving a linkage position value $\theta_1^*$ as a function of the angular velocity value of the virtual line shaft, the angular position value of the virtual line shaft and the characteristics of the first mechanical linkage;

determining a position error value $\theta_{err_1}$ from a difference between the linkage position value $\theta_1^*$ and the first position $\theta_1$;

producing the first force feedback signal by applying an active stiffness gain $K_{sr2_1}$ value for the first mechanical linkage to the position error value $\theta_{err_1}$.

15. The method as recited in claim 2 wherein simulating the virtual first mechanical linkage further comprises:

deriving a linkage velocity value $\omega_1^*$ as a function of the angular velocity value of the virtual line shaft, the angular position value of the virtual line shaft, and the characteristics of the first mechanical linkage;

determining a velocity error value $\omega_{err_1}$ from a difference between the linkage velocity value $\omega_1^*$ and the first velocity $\omega_1$;

deriving a first intermediate signal by applying a value corresponding to an active damping gain $b_{r2_1}$ of the first axis to the velocity error value $\omega_{err_1}$;

deriving a linkage position value $\theta_1^*$ as a function of the angular position value of the virtual line shaft and the characteristics of the first mechanical linkage;

determining a position error value $\theta_{err_1}$ from a difference between the linkage position value $\theta_1^*$ and the first position $\theta_1$;

deriving a second intermediate signal by applying a value corresponding to an active stiffness gain $K_{sr2_1}$ of the first mechanical linkage to the position error value $\theta_{err_1}$; and producing the first force feedback signal from the first and second intermediate signals.

16. The method as recited in claim 2 wherein simulating the virtual first mechanical linkage further comprises:

deriving a linkage position value $\theta_1^*$ as a function of the angular position value of the virtual line shaft and the characteristics of the first mechanical linkage;

determining a position error value $\theta_{err_1}$ from a difference between the linkage position value $\theta_1^*$ and the first position $\theta_1$;

integrating the position error value $\theta_{err_1}$ to produce an integrated error value; and producing the first force feedback signal by applying a value corresponding to an active integrated stiffness gain $K_{isr2_1}$ of the first mechanical linkage to the integrated error value.

17. The method as recited in claim 2 wherein simulating the virtual first mechanical linkage further comprises:

deriving a linkage velocity value $\omega_1^*$ as a function of the angular velocity value of the virtual line shaft, the angular position value of the virtual line shaft, and the characteristics of the first mechanical linkage;

determining a velocity error value $\omega_{err_1}$ from a difference between the linkage velocity value $\omega_1^*$ and the first velocity $\omega_1$;

deriving a first intermediate signal by applying a value corresponding to an active damping gain $b_{r2_1}$ of the first axis to the velocity error value $\omega_{err_1}$;

deriving a linkage position value $\theta_1^*$ as a function of the angular position value of the virtual line shaft and the characteristics of the first mechanical linkage;

determining a position error value $\theta_{err_1}$ from a difference between the linkage position value $\theta_1^*$ and the first position $\theta_1$;

deriving a second intermediate signal by applying a value corresponding to an active stiffness gain $K_{sr2_1}$ of the first mechanical linkage to the position error value $\theta_{err_1}$; and integrating the position error value $\theta_{err_1}$ to produce an integrated error value; and deriving a third intermediate signal by applying a value corresponding to an active integrated stiffness gain $K_{isr2_1}$ of the first mechanical linkage to the integrated error value;

combining the first intermediate signal, the second intermediate signal and the third intermediate signal to produce a force feedback value $T_{sfbr2_1}$; and producing the first force feedback signal from the force feedback value.

18. The method as recited in claim 17 wherein the step of producing the first force feedback signal is in response to the force value and the characteristics of the first mechanical linkage, so that the first force feedback signal becomes a dynamically variable kinematic force feedback signal.

19. The method as recited in claim 2 wherein the step of producing the first force feedback signal also is responsive to the characteristics of the first mechanical linkage, so that the first force feedback signal becomes a dynamically variable kinematic force feedback signal.

20. A method for controlling a machine which has members that move with respect to a plurality of n axes where n is a plural positive integer, and wherein movement along and about each axis is produced by a separately powered actuator controlled by a computer and wherein movement along and about each axis is controlled in response to motion with respect to other axes, said method comprising steps of:

(a) defining characteristics of a line shaft for powering the machine;

(b) for each one of the plurality of n axes defining characteristics of a separate mechanical linkage with dynamically variable kinematics that is driven by the line shaft to produce movement along one axis;

(c) simulating on the computer a virtual line shaft using the characteristics of the line shaft including a virtual replication of relative stiffness, wherein the simulating produces an angular acceleration value of the virtual line shaft, an angular velocity value of the virtual line shaft and an angular position value of the virtual line shaft;

(d) simulating on the computer a separate virtual mechanical linkage with dynamically variable kinematics for each one of the plurality of n axes using characteristics defined in step (b), an angular acceleration value of the virtual line shaft, the angular velocity value of the virtual line shaft, the angular position value of the virtual line shaft, a first position of machine movement with respect to one of the plurality of n axes, a first velocity of machine movement with respect one of the plurality of n axes, wherein the simulating of each virtual mechanical linkage produces a control signal for operating a servo-motor for an axis of the machine and produces a dynamically variable kinematic feedback force signal; and (e) controlling the servo-motors for each axis with control signals produced by step (d);

wherein the step of simulating a virtual line shaft also is responsive to dynamically variable kinematic force feedback signals produced by step (d).

21. The method as recited in claim 20 wherein said step of simulating on the computer a separate virtual mechanical linkage for each one of the plurality of n axes comprises:

determining an axis position $\theta_n$ and an axis velocity $\omega_n$ of machine movement with respect to each axis, where n is a number denoting a particular axis;

deriving a linkage position value $\theta_n^*$ for each axis as a function of the angular position value of the virtual line shaft and the characteristics of the mechanical linkage for each axis;

deriving a linkage velocity value $\omega_n^*$ for each axis as a function of the angular position value, the angular velocity value and the characteristics of the mechanical linkage for each axis; and determining a velocity error value $\omega_{err_n}$ for each axis from a difference between the linkage velocity value $\omega_n^*$ for each axis and the axis velocity $\omega_n$ for each axis;

deriving a first intermediate value for each axis by applying a value corresponding to an active damping gain $b_{r1_n}$ for each axis to the velocity error value $\omega_{err_n}$ for each axis;

determining a position error value $\theta_{err_n}$ for each axis from a difference between the linkage position value $\theta_n^*$ for each axis and a measured position $\theta_n$ of each axis;

deriving a second intermediate value for each axis by applying a value corresponding to an active stiffness gain $K_{sr1_n}$ for each axis to the position error value $\theta_{err_n}$ for each axis;

integrating the position error value $\theta_{err_n}$ for each axis to produce integrated error value for each axis;

deriving a third intermediate value for each axis by applying a value corresponding to an active integrated stiffness gain $K_{isr1_n}$ for each axis to the integrated error value for each axis; and for each axis combining the first intermediate value, the second intermediate value and the third intermediate value for a given axis to produce a force value $T^*_{sfbr1_n}$ for the given axis from which a control signal for a servo-motor is produced.

22. The method as recited in claim 20 wherein said step of simulating on the computer a separate virtual mechanical linkage for each one of the plurality of n axes comprises:

for each axis determining an axis position $\theta_n$ and axis velocity $\omega_n$ of machine movement with respect to an axis, where n is a number denoting a particular axis;

deriving a linkage position value $\theta_n^*$ for each axis as a function of the angular position value of the virtual line shaft and the characteristics of the mechanical linkage for each axis;

deriving a linkage velocity value $\omega_n^*$ as a function of the angular velocity value of the virtual line shaft, the angular position value of the virtual line shaft, and the characteristics of the first mechanical linkage; and determining a velocity error value $\omega_{err_n}$ for each axis from a difference between the linkage velocity value $\omega^*_n$ and a velocity $\omega_n$ for each axis;

deriving a first intermediate value for each axis by applying a value corresponding to an active damping gain $b_{r2_n}$ for each axis to the velocity error value $\omega_{err_n}$ for each axis;

determining a position error value $\theta_{err_n}$ for each axis from a difference between the linkage position value $\theta_n^*$ and a position $\theta_n$ of each axis;

deriving a second intermediate value for each axis by applying a value corresponding to an active stiffness gain $K_{sr2_n}$ of the mechanical linkage for each axis to the position error value $\theta_{err_n}$ for each axis;

integrating the position error value $\theta_{err_n}$ for each axis to produce an integrated error value for each axis;

deriving a third intermediate value for each axis by applying a value corresponding to an active integrated stiffness gain $K_{isr2_n}$ for each axis to the integrated error value for each axis; and for each axis combining the first intermediate value, the second intermediate value and the third intermediate value to produce a force value $T_{sfbr2_n}$ for each axis from which the dynamically variable kinematic force feedback signal is produced.

23. The method as recited in claim 20 wherein the machine is a filament winding machine which has a payout eye that applies a filament to a surface of a mandrel which rotates about a rotational axis, wherein the payout eye moves along a carriage axis parallel to the rotational axis, along a crossfeed axis traverse to the rotational axis, and pivots about a pivot axis.

* * * * *